US011725621B2

(12) United States Patent
Skjoldhammer et al.

(10) Patent No.: US 11,725,621 B2
(45) Date of Patent: Aug. 15, 2023

(54) POWER TAKE-OFF APPARATUS FOR A WAVE ENERGY CONVERTER AND WAVE ENERGY CONVERTER COMPRISING THE SAME

(71) Applicant: Novige AB, Täby (SE)

(72) Inventors: Jan Skjoldhammer, Täby (SE); Timo Pohjanvuori, Hovås (SE)

(73) Assignee: Novige AB, Täby (SE)

( * ) Notice: Subject to any disclaimer, the term of this patent is extended or adjusted under 35 U.S.C. 154(b) by 0 days.

(21) Appl. No.: 17/800,919

(22) PCT Filed: Feb. 19, 2021

(86) PCT No.: PCT/SE2021/050143
§ 371 (c)(1),
(2) Date: Aug. 19, 2022

(87) PCT Pub. No.: WO2021/167523
PCT Pub. Date: Aug. 26, 2021

(65) Prior Publication Data
US 2023/0077335 A1    Mar. 16, 2023

(30) Foreign Application Priority Data
Feb. 20, 2020    (SE) .................................. 2050189-6

(51) Int. Cl.
*F03B 13/00*     (2006.01)
*F03B 13/18*     (2006.01)
(Continued)

(52) U.S. Cl.
CPC ............ *F03B 13/1875* (2013.01); *E02B 9/08* (2013.01); *F03B 13/145* (2013.01); *F05B 2260/87* (2020.08)

(58) Field of Classification Search
CPC ................ F03B 13/1875; F03B 13/145; F05B 2220/703; F05B 2240/2411; F05B 2260/87; E02B 9/08; Y02E 10/30
(Continued)

(56) References Cited

U.S. PATENT DOCUMENTS 3,487,228 A * 12/1969 Kriegel ................. F03B 13/187
60/497
3,515,889 A *  6/1970 Kammerer ............ F03B 13/187
290/53
(Continued)

FOREIGN PATENT DOCUMENTS

DE           2726425 A1    1/1979
WO       WO8103358 A1   11/1981
WO    WO2017217919 A1   12/2017

OTHER PUBLICATIONS

Search Report for PCT/SE2021/050143 dated Mar. 6, 2021, (4 pages).

*Primary Examiner* — Julio C. Gonzalez
(74) *Attorney, Agent, or Firm* — Reising Ethington P.C.

(57) ABSTRACT

A power take-off apparatus for a wave energy converter of point absorber type, includes a cylinder attachable to a floating device, a piston that reciprocates inside the cylinder and has a piston rod attachable to a mooring, at least one penstock with a first end in communication with a second end of the cylinder through a first opening, and a second end having a second opening, and a housing above a cylinder first end. The housing communicates with the penstock through the second opening and with the cylinder through a third opening in the housing such that the cylinder, penstock and the housing form a closed loop for a fluid in the power take-off apparatus. A water turbine is arranged inside the housing so that working fluid entering the housing from the
(Continued)

at least one penstock causes rotation of the water turbine to drive an electrical generator connected thereto.

18 Claims, 7 Drawing Sheets

(51) Int. Cl.
*E02B 9/08* (2006.01)
*F03B 13/14* (2006.01)

(58) Field of Classification Search
USPC .......................... 60/503, 497, 496; 417/333
See application file for complete search history.

(56) References Cited

U.S. PATENT DOCUMENTS

| | | | |
|---|---|---|---|
| 4,203,294 A | 5/1980 | Budal et al. | |
| 5,701,740 A | 12/1997 | Tveter | |
| 6,812,588 B1 * | 11/2004 | Zadig | F04B 17/00 |
| | | | 417/331 |
| 2011/0115229 A1 | 5/2011 | Rourke | |
| 2018/0135591 A1 | 5/2018 | Alm | |

* cited by examiner

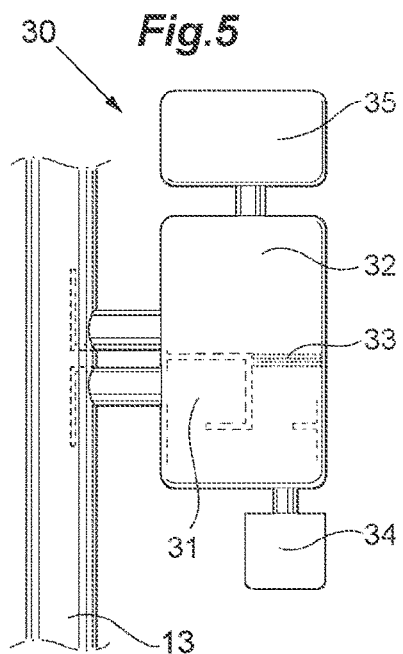
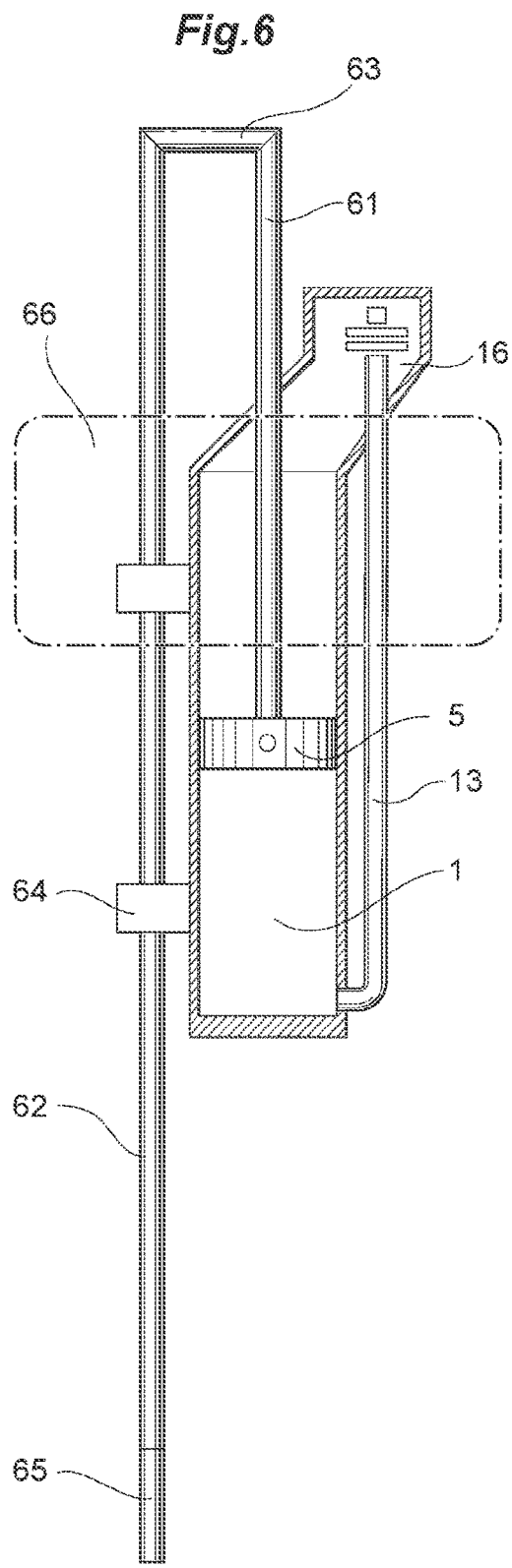
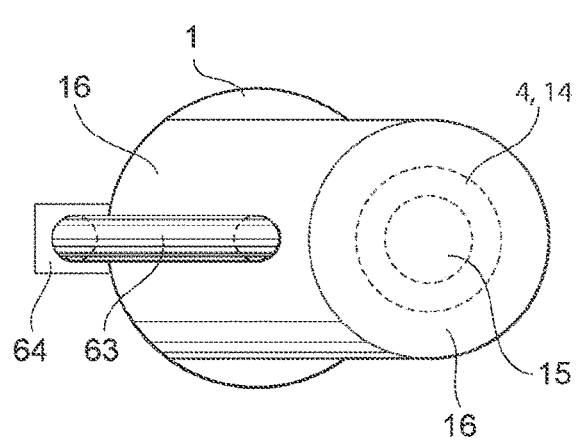

POWER TAKE-OFF APPARATUS FOR A WAVE ENERGY CONVERTER AND WAVE ENERGY CONVERTER COMPRISING THE SAME

REFERENCE TO RELATED APPLICATIONS

This application is a national stage entry of International Patent Application Serial No. PCT/SE2021/050143, filed on Feb. 19, 2021, which claims priority to Swedish Patent Application No. 2050189-6, filed on Feb. 20, 2020, which are hereby incorporated herein by reference.

TECHNICAL FIELD

The present disclosure relates generally to a power take-off (PTO) apparatus for harvesting energy from waves, more specifically to be used in a wave energy converter (WEC) of point absorber type.

BACKGROUND

The tremendous forces in sea waves as a potential for extracting electrical energy, is well known. Examples of wave energy converters for harnessing this potential are disclosed in e.g. WO 98/20253, EP 0 265 594, WO 2009/093988, US 2004/160060, GB 2472055, U.S. Pat. No. 5,701,740 and WO 2017/217919.

However, one potential problem with the power take-off systems known in the art is that they utilise seawater as a working fluid being suctioned into the cylinder, pumped from the cylinder to the water turbine through the penstock and returned to the sea. Such a solution has several drawbacks in that saline seawater is highly corrosive on the components of the PTO system, lowering the lifetime of the PTO system and/or necessitating replacement of the components. Adding additives such as conditioners, lubricants and anti-corrosive agents would not alleviate this problem long-term as the additives will be washed away by the seawater passing through the PTO system. Additionally, such additives as well as particles from within the system, from seals, metal, bearings, leakages, will be expelled out from the upper opening of the cylinder or turbine housing, which over time could contribute to pollution of the surrounding seawater. Manufacturing all the components in more corrosion resistant materials such as stainless steel could be one alternative, but because of severe challenges with galvanic corrosion for different components, as well the higher metal costs associated, this is not feasible.

Furthermore, the intake of seawater may lead to contamination and/or debris, as well as marine bio-organisms, entering the system through the openings in the cylinder. This could lead to scaling, fouling and build-up of residuals inside the cylinder which requires cleaning at regular intervals. Moreover, protective measures would be necessary to safeguard marine life from powerful intermittent underwater suction. Precautionary remedies to overcome these obstacles include high-capacity filtering and cleaning utilities on both water inlets and outlets. Such high-capacity filtering/cleaning systems would increase weight and decrease technical performance, thus increasing cost of manufacturing and service of the PTO system.

U.S. Pat. No. 4,203,294 A discloses a system for conversion of sea wave energy to useful energy comprising a buoy, a piston-cylinder arrangement, low and high-pressure vessels, with a connecting tube therebetween and a turbine. A number of valves control flow of fluid through the system. Due to upwards and downwards displacement of the buoy, fluid is transferred from the low-pressure vessel to the high-pressure vessel via the space above the piston during an oscillation cycle. A certain amount of fluid is transferred from the high-pressure vessel to the low-pressure vessel through the connecting tube due to the pressure gradient to rotate the turbine which is connected to an electric generator to deliver useful power. This solution requires controlling the valves to obtain resonant oscillation of the buoy by pressing the buoy below the water surface in order to maximize power take-off. Additionally, the high-pressure vessel needs to be of considerable size, which adds to the weight and complexity of the wave energy converter.

Thus, there is a need for improved power take-off systems to overcome the deficiencies and disadvantages mentioned above.

SUMMARY

An object of at least some implementations of the present disclosure is to provide a solution which addresses the problems outlined above. This object is achieved in a first aspect of the disclosure, in which there is provided a power take-off apparatus for a wave energy converter of point absorber type, comprising a cylinder adapted to be attached to a floating device and comprising a first upper end and a second lower end; a piston arranged to reciprocate inside the cylinder and having a piston rod adapted to be attached to a mooring; at least one penstock arranged parallel to the cylinder and comprising a first lower end in fluid communication with the second end of the cylinder through a first opening therebetween, and a second upper end comprising a second opening; a housing arranged above the first end of the cylinder, wherein the housing is in fluid communication with the penstock through the second opening; and a water turbine arranged inside the housing and oriented such that working fluid entering the housing from the at least one penstock through the second opening causes rotation of the water turbine to drive an electrical generator connected thereto; wherein working fluid present in the second end of the cylinder below the piston will enter into the at least one penstock through the first opening and exit the at least one penstock through the second opening in response to a downward stroke of the piston in relation to the cylinder; wherein the housing is in fluid communication with the first end of the cylinder through a third opening in a bottom of the housing such that the cylinder, the at least one penstock and the housing together form a closed loop for a working fluid in the power take-off apparatus; and wherein the power take-off apparatus further comprises at least one forward conduit having at least one one-way valve arranged to allow passage of the working fluid only in a direction from the first end of the cylinder above the piston through the at least one forward conduit to the second end of the cylinder below the piston in response to an upward stroke of the piston in relation to the cylinder.

The device according to the present disclosure provides a closed loop system to contain the working fluid within the power take-off apparatus. By the up and down reciprocal motion of the piston in relation to the cylinder, a working fluid is pumped into the at least one penstock and further directed towards the water turbine to cause rotation and generate electrical energy. Subsequently, the working fluid falls down inside the housing towards the first, upper end of the cylinder by the influence of gravity, thus completing the closed loop. As a result, the internal components of the PTO system will not be exposed to seawater, including corrosive salts and bio-organisms. This prevents or minimizes fouling and deterioration of the components, which in turn reduces the need for service and maintenance, and prolongs the lifetime of the PTO system. The novel PTO apparatus obviates the need for filtering/cleaning as well as protection against corrosion and thereby ensures maintained long-term performance. Moreover, the closed system ensures that the working fluid and any particles present therein, e.g. emanating from wear of the internal components, will not be expelled into and pollute the surrounding environment, thus achieving an improved environmentally friendly solution for harvesting wave energy. Additionally, the closed system provides improved protection of marine wildlife in that the risk of powerful underwater suction is eliminated.

Other advantages of the PTO apparatus according to the present disclosure relative other marine energy devices, is the huge lifting force possible with for instance a combination with a rectangular float in a WEC system, the simple conversion of the slow wave movement to high-speed rotational movement of the generator, with a well proven iteration of the hydro power plant, the simple method of latching in the wave trough, as well as the non-resonant behaviour, avoiding the otherwise very complex adjustment of resonant concepts in irregular waves.

In one embodiment, the at least one forward conduit is arranged in the piston. This solution eliminates additional piping external to the cylinder and provides a compact configuration of the power take-off apparatus. Alternatively, the at least one forward conduit comprises a return line arranged external to the cylinder.

In one embodiment, the power take-off apparatus further comprises a conditioner unit arranged in fluid communication with the closed loop formed by the cylinder, penstock, and housing, wherein the conditioner unit is arranged to replenish the closed loop of the power take-off apparatus with working fluid, monitor the working fluid, clean the working fluid, and/or add additives to the working fluid which reduce friction and/or corrosion in the power take-off apparatus. Preferably, the conditioner unit comprises a fluid analysis chamber, a mixing chamber, a filter, a waste chamber, and/or an additive chamber. The conditioner unit achieves improved performance of the power take-off apparatus in that lubricants and/or anti-corrosives provides an optimal working fluid which reduces frequency of maintenance and thereby cost. Continuous monitoring of the state of the working fluid may be performed and cleaning or replenishment of the working fluid may be carried out as necessary to ensure optimal working conditions for the power take-off apparatus.

In one embodiment, the power take-off apparatus further comprises a flywheel arranged to rotate coaxially with an axis of rotation of the water turbine, wherein the water turbine and the flywheel are separated by a partition wall inside the housing. The flywheel is arranged to co-rotate with the water turbine to store rotational energy and thereby maintain rotation of the water turbine during the upward stroke of the piston and no working fluid acts on the water turbine, i.e. when the floating device of the wave energy converter moves downward with the waves.

In one embodiment, the power take-off apparatus further comprises a pressure tank arranged between the water turbine and the at least one penstock, wherein the pressure tank is arranged to provide a substantially continuous and constant pressure of the working fluid delivered to the water turbine. By providing a pressure tank, it is possible to provide substantially continuous flow of working fluid at substantially constant pressure to act on the water turbine, thereby enabling reduction of the weight of the flywheel, or emission of the flywheel all together.

In one embodiment, the generator is arranged to rotate the water turbine in order to control the rotational speed of the water turbine when the working fluid does not cause rotation of the water turbine. By making the generator act as a motor to rotate the water turbine, for instance during a descending phase of a wave when no working fluid is exiting the penstock(s) to drive the water turbine, it is possible to maintain an optimal level of RPM of the water turbine in relation to the speed of the working fluid hitting the buckets of the water turbine, thereby reducing energy losses and achieving a higher power conversion efficiency.

In one embodiment, the power take-off apparatus further comprises at least one valve arranged in the at least one penstock and configured to allow passage of working fluid only in a direction from the first lower end to the second upper end of the at least one penstock. For example, by providing a one-way valve in the at least one penstock, return of working fluid to the cylinder during an upward stroke of the piston is prevented. This directional flow may otherwise be secured by an electrical/hydraulically/pneumatically or otherwise operated valve, that closes when the float moves downwards in the waves and opens when flow is desired upwards to the nozzle. This valve may also be combined with the nozzle, often a spear valve.

In one embodiment, the power take-off apparatus further comprises at least one first bypass conduit arranged in fluid communication with the at least one penstock and the housing below the water turbine or the first end of the cylinder, wherein the at least one first bypass conduit comprises a first relief valve configured to open at a predetermined pressure to allow passage of the working fluid from the at least one penstock through the at least one first bypass conduit to housing below the water turbine or the first end of the cylinder.

In one embodiment, the power take-off apparatus further comprises at least one second bypass conduit and having a first lower end in fluid communication with the second end of the cylinder and a second upper end in fluid communication with the housing below the water turbine or the first end of the cylinder, wherein the at least one second bypass conduit comprises a second relief valve configured to open at a predetermined pressure to allow passage of the working fluid from the second end of the cylinder below the piston through the at least one second bypass conduit to the housing below the water turbine or the first end of the cylinder above the piston. Optionally, the at least one second bypass conduit is arranged in the piston, thus providing a compact bypass solution.

By providing bypass conduits in fluid communication with various components in conjunction with relief valves at one or more positions along the closed-loop system, redundant protection of the power take-off apparatus is achieved against built-up pressure in case the flow of working fluid is impeded or blocked. This fail-safe mechanism ensures that the components of the power take-off apparatus are not damaged by continued up and down movement of the piston caused by incoming waves.

In one embodiment, the power take-off apparatus further comprising a cylinder partition dividing the second end of the cylinder into two spaces, wherein the partition comprises an opening with a high-pressure seal surrounding the piston rod and a bottom wall of the cylinder comprises an opening with a low-pressure seal surrounding the piston rod, wherein a lower space is in fluid communication with the first end of the cylinder through at least one third bypass conduit to allow passage of the working fluid in a direction from the lower space to the first end of the cylinder. By partitioning the second, lower end of the cylinder and providing high- and low-pressure seals around the piston rod, potential leakage to the surrounding water is further minimised, as well as prolonging the lifetime of the high-pressure seal.

In one embodiment, the piston rod comprises a first section attached to the piston from above, a second section arranged externally to the cylinder parallel to the first section, and a third section joining the first and second sections above the cylinder, wherein the cylinder comprises a pair of sliding couplings arranged to allow sliding of the cylinder along the second section of the piston rod. With an alternative configuration of the piston rod attached to the piston from above, the cylinder no longer requires a seal at the lower end, thus ensuring that the working fluid cannot escape from the closed-loop system, and conversely no seawater can enter into the closed-loop system. The advantage of this configuration is that the seal between the cylinder and the piston rod can be placed out of direct contact with the seawater by having the part of the piston rod which enters into the cylinder extending upwards.

In one embodiment, the piston rod is arranged to be attached to a separate offshore structure, such as the leg(s) of an oil rig. This enables a wave energy converter to utilise pre-existing installations, and the water depth at the site of installation is irrelevant since the piston rod will then be substantially fixed in relation to the seafloor through the attachment to the offshore structure. This attachment of the piston rod to a separate offshore structure is possible both with the conventional downwardly oriented piston rod, as well as the novel inverse configuration with an upwardly oriented piston rod described above.

In a second aspect of the present disclosure, there is provided a wave energy converter of point absorber type comprising a floating device, and a power take-off apparatus according to the first aspect.

In a third aspect of the present disclosure, there is provided a use of the power take-off apparatus according to the first aspect in a wave energy converter of point absorber type to generate electrical energy from wave power in a body of water.

In one embodiment, the generator is used to rotate the water turbine to control the rotational speed of the water turbine when the working fluid does not cause rotation of the water turbine. By controlling the rotational speed of the water turbine by means of the generator acting as a motor, it is possible to maintain an optimal level of RPM of the water turbine in relation to the speed of the working fluid hitting the buckets of the water turbine, thereby reducing energy losses and achieving a higher power conversion efficiency.

BRIEF DESCRIPTION OF THE DRAWINGS

The disclosure is now described, by way of example, with reference to the accompanying drawings, in which:

FIG. 5 shows a schematic close-up view of the conditioner unit of FIG. 4;

FIG. 6 shows a schematic cross-sectional view of a power take-off apparatus including an alternative piston rod according to one embodiment of the present disclosure;

FIG. 7 shows a perspective view of parts of the power take-off apparatus in FIG. 6 as seen from above;

DETAILED DESCRIPTION

Figure 1:
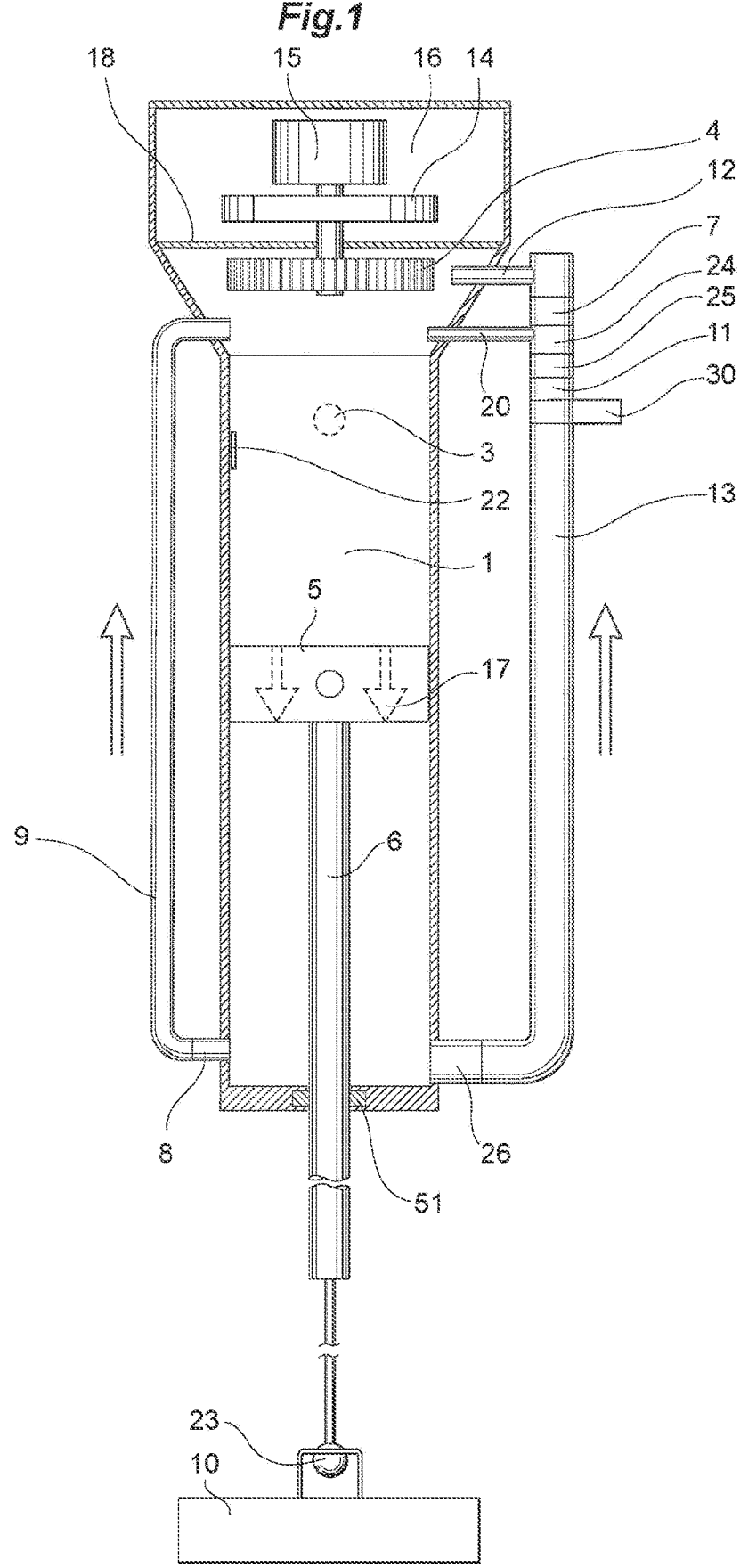
FIG. 1 shows a schematic cross-sectional view of a power take-off apparatus according to a first embodiment of the present disclosure.

In the following, a detailed description of a power take-off apparatus for a wave energy converter of point absorber type according to the present disclosure is presented. In the drawing figures, like reference numerals designate identical or corresponding elements throughout the several figures. It will be appreciated that these figures are for illustration only and are not in any way restricting or limiting the scope of the present disclosure.

The power take-off apparatus according to the present disclosure works according to the same or similar principle as the one disclosed in WO 2017/217919 mentioned above, the contents of which are incorporated herein by reference. In the following, the terms 'power take-off (apparatus)' and its abbreviation 'PTO', as well as 'wave energy converter' and its abbreviation WEC, will be used interchangeably.

Referring now to FIG. 1, there is illustrated a power take-off apparatus according to one embodiment of the present disclosure. The PTO comprises four main components and a number of auxiliary/optional components, as well as monitoring/sensing devices known in the art to ensure functioning and safety of the apparatus. The main components comprise a piston-cylinder arrangement including a piston 5 and piston rod 6 arranged in a reciprocating manner inside a cylinder 1; one or more penstocks 13 arranged parallel to the cylinder 1; a housing 16 arranged above the upper end of the cylinder 1; and a water turbine 4 arranged inside the housing 16. The cylinder 1, the at least one penstock 13 and the housing 16 are arranged in fluid communication with each other so as to form a closed loop for a working fluid which is caused to flow through the PTO in response to upwards and downwards movement of a floating device (not shown), to which the PTO is attachable, in sea waves.

Figure 9:
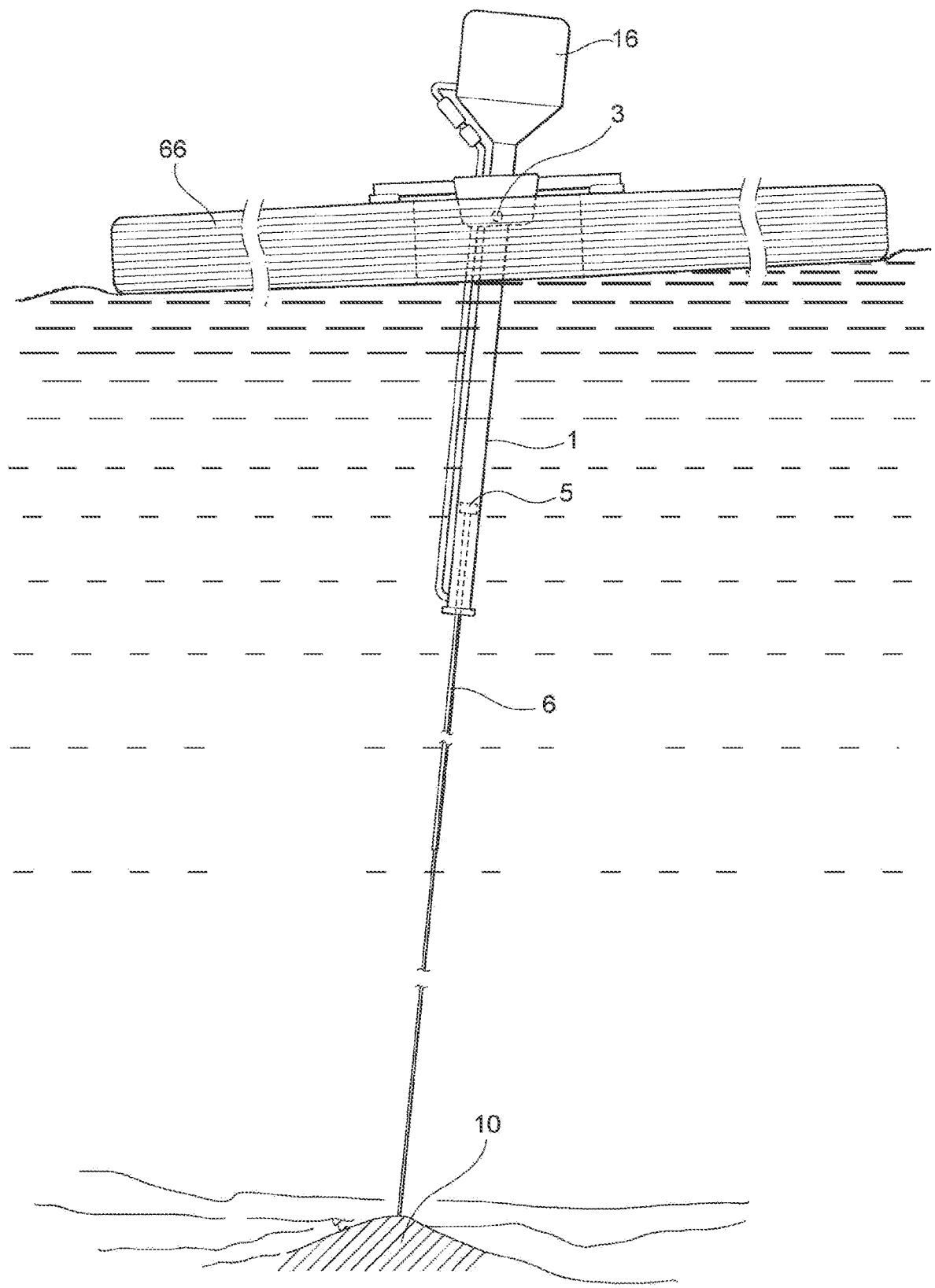
FIG. 9 shows a schematic view of a floating platform with a power take-off apparatus according to one embodiment of the present disclosure.

Referring to FIG. 9, there is shown an exemplary of a wave energy converter of point absorber type, incorporating a power take-off apparatus in accordance with the present disclosure. The cylinder 1 may be connected to a floating device or platform 66 through a bearing 3 in a manner which allows the PTO to be oriented substantially vertically, regardless of the orientation of the floating platform due to the waves. This may be achieved by means of a swivel connection which permits rotation about one or two substantially horizontal axes of rotation, independently of each other, optionally for a swivelling movement, applicable typically for a free-floating device. However, other fixations to the cylinder 1, are also applicable, for instance in a more fixed structure or frame, with the cylinder and float fixed together as one unit, or by other means for the water forces to create a lifting force. One exemplary floating device which may be used in conjunction with the power take-off apparatus of the present disclosure is disclosed in WO 2017/160216, which is incorporated herein by reference. Other shapes of floating devices are also encompassed in the present disclosure.

Inside the cylinder 1, a piston 5 is present, preferably having piston rings (not shown) suitable to work with the chosen cylinder material. As the up and down strokes of the piston 5 in relation to the cylinder 1 mostly will shift direction every 2-8 seconds, plus the speed being 0.5-1.5 metres per second, the piston rings do not have to seal perfectly. This because the volume and speed of the working fluid will be little affected by a minor compression leakage. In one embodiment, the piston 5 comprises one or more forward conduits formed therein, each having a one-way valve 17 arranged therein or in connection to it, allowing the working fluid to pass through the forward conduit it when the piston 5 moves upwards relative the cylinder 1 through a volume of standing working fluid present in the upper end of the cylinder 1 above the piston 5. When the piston 5 moves in the opposite direction, the valve(s) 17 will close, thereby causing compression in the lower end of the cylinder 1. The valve(s) 17 may be positioned in the piston itself, or above or below, also spring loaded to support the closing. This/these valve(s) 17 may also incorporate a safety pressure valve, so that above a certain pressure, the working fluid will be able to pass upwards through the piston 5.

The piston 5 is connected to a piston rod 6, which slides in a bushing, at the lower end of the cylinder 1 and extends downwards out of the cylinder 1 through an opening therein. One purpose of this bushing is to keep the piston rod 6 steady in the centre of the cylinder 1. It will also include a lower scrape ring to keep the piston rod 6 clean, as well as a compression ring/high-pressure seal 51 nearest the inside of the cylinder 1 to prevent leakage of working fluid into the surrounding sea.

Figure 8:
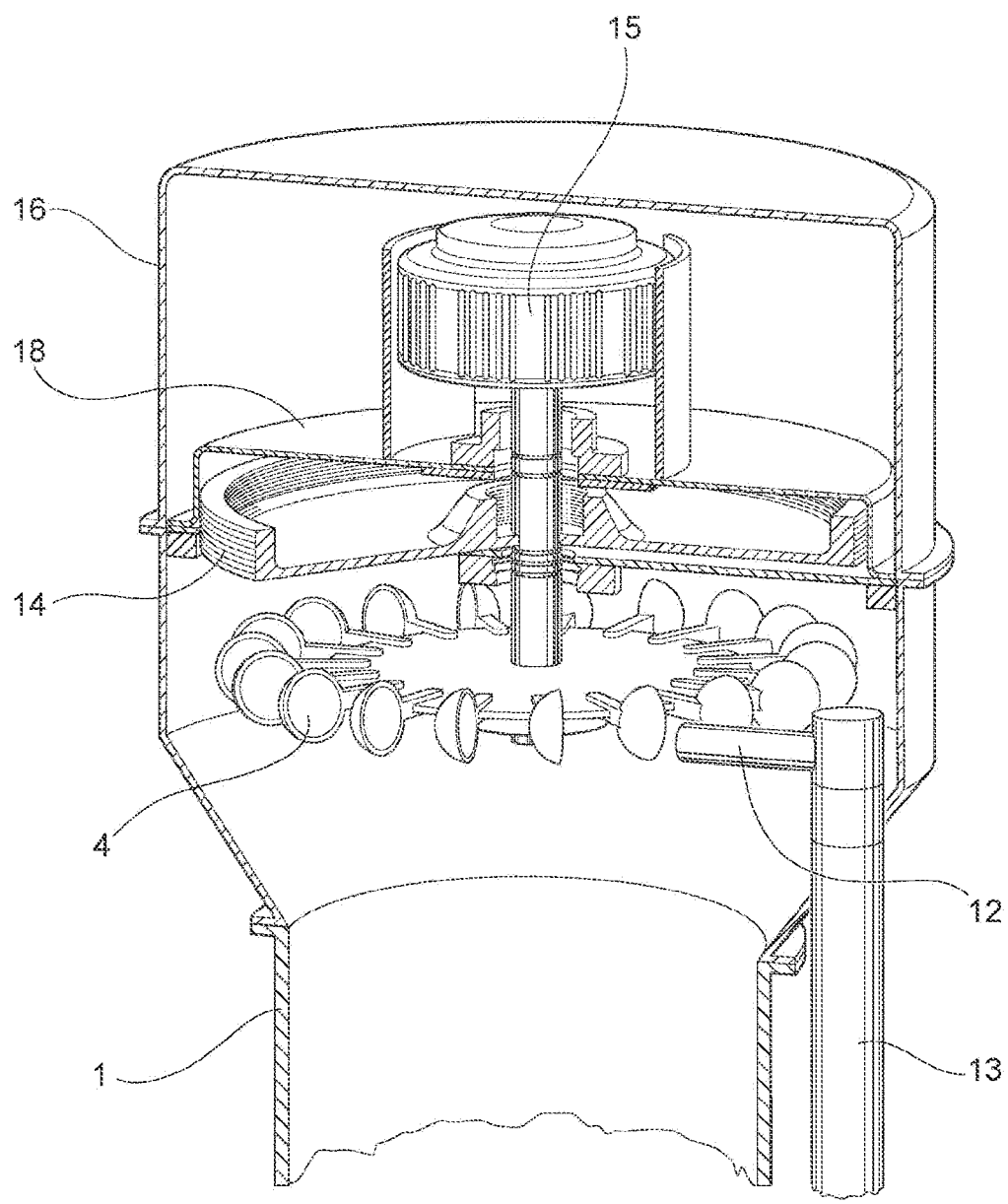
FIG. 8 shows a partially cutaway perspective view of the housing of the power take-off apparatus according to one embodiment of the present disclosure.

As may be seen in FIG. 1, a penstock 13 is arranged parallel to the cylinder 1 and in fluid communication with the interior of the cylinder 1 at a lower end thereof through a first, lower opening. The penstock 13 extends alongside the cylinder 1 towards the upper end thereof and culminates in a second, upper opening which debouches into a housing 16 to establish fluid communication there between. The housing 16 is shown in greater detail in FIG. 8. At least one spear valve 12 or another valve with similar cut off/on and/or adjustment function, is arranged in an upper opening of the penstock 13, possibly in combination with a separate pressure relief valve 7, or combined in one. The pressure relief valve 7 may be a drum, ball, or solenoid valve driven electrically, hydraulically or by air pressure. In addition, or as an alternative, a one-way valve 11 may be arranged in the penstock 13. The spear valve 12 is oriented into the housing 16 towards the water turbine 4 to direct the flow of working fluid to drive the water turbine 4. The valves 7, 12 will open when a specific pressure required for optimal operation of the water turbine 4 is obtained. Thus, the working fluid will flow out of the spear valves 12 at high speed, hitting the buckets or impulse blades of the water turbine 4, driving the water turbine 4 at an optimum speed.

It is possible and also recommended to provide a pressure relief valve 24 in the top section of the penstock 13 opening into a bypass conduit in the form of a penstock pressure relief tube 20 from the penstock 13 to the housing 16 below the water turbine 4 or directly into the upper end of the cylinder 1. In case the spear valve 12 should become blocked, the built-up pressure in the penstock 13 can be released by dumping the working fluid directly into the housing 16 or cylinder 1 through the penstock pressure relief tube 20, effectively bypassing the spear valve 12.

The RPM of the water turbine 4, the flywheel 14, and generator 15, preferably arranged on the same axis, is regulated with the load drawn to the grid or other receiving unit (such as e.g. an assembly for hydrogen production located onboard, or battery storage on board or onshore, or on an adjacent floating device, or onshore) so that working fluid speed and RPM is at a preferred ratio. In a simpler but less effective manner, the PTO system will also be able to function with a fixed orifice nozzle at the second, upper opening of the penstock 13, and only with a one-way valve 11 arranged therein, or along the penstock 13. Thus, it will not be able to latch completely at the wave trough, but through resistance in the nozzle, be able to build considerable pressure and deliver high power output as well. However, the ability to cut off/on function, will in most wave conditions, produce a higher output.

In another embodiment, the continuous rotation of the common axis of the water turbine 4 and the flywheel 14 (in some cases also the generator 15), and even adjustment of RPM to perfectly match the pressure and thereby the speed of the working fluid hitting the water turbine 4, a battery or draining of current from the grid may be used. The generator 15 will instead act as a motor during this phase to rotate the water turbine 14. In this solution, there is no delivery of electricity to the grid in the descending phase of the wave, but with more than approximately ten units in an array of wave energy converters, this will not affect the steady delivery of current to the grid, as the power evens out with a larger number of WEC units. The advantage of this comes from the fact that the optimum RPM from a turbine, has a direct relation to the perimeter speed of the turbine. For instance, a Pelton turbine needs two times the speed of the working fluid versus the buckets, for best efficiency.

By having a smaller flywheel, possible none, the RPM can be adjusted to match the next incoming wave. As every incoming wave has a specific height, there is an optimum draft of the float before latch release, or without latching, the size of the orifice of the nozzle of the spear valve. By measuring the incoming wave height, adjusting the RPM quickly to match the expected pressure and speed of the working fluid, the efficiency of the turbine may be increased. To achieve the optimum output, a measuring device placed on the side of the floating device, or on a remote buoy or at the seafloor, may measure the nearest incoming wave, so as to adjust the perfect setting for every single wave, instead of just the average wave.

The housing 16 is arranged above the cylinder 1, in fluid communication with the upper end thereof through a third opening at the bottom of the housing 16 such that working fluid will fall into the cylinder 1 under the influence of gravity. The internal space of the cylinder 1, the at least one penstock 13 and the housing 16 together form a closed-loop system for circulation of a working fluid therein. Preferably, the housing 16 is fluid tight at least in the surface areas which will normally come into contact with the working fluid to prevent leakage. As may be seen in FIG. 1, the housing 16 is preferably tapered in a downward direction towards the upper end of the cylinder 1 to funnel the working fluid. This configuration also enables accommodating equipment larger than the diameter of the cylinder 1 in the housing 16.

Above the cylinder 1 inside the housing 16, a water turbine 4 is mounted, preferably an impulse turbine such as a Pelton wheel/turbine type or a water turbine operating in a similar principle (e.g. Turgo turbine). As an alternative, a reaction turbine such as a Francis turbine or similar submerged turbines may be used, only requiring the housing 16 to be slightly higher, to increase the height of the wet section under a housing partition 18 acting as a dividing floor. In other words, with a Pelton turbine, the working fluid level will be about level with the top of the cylinder 1, with a Francis turbine, the working fluid level will be above the water turbine wheel. alternatively, a turbine driving a hydraulic pump is plausible. The Pelton turbine has the advantage of being able to work out of water, i.e. not fully submerged, as well as giving excellent performance under a wide range of pressures and flow rates.

In operation, when the floating device starts to move downwards, the pressure and working fluid flow in the penstock 13 goes to zero, the one-way valve 11 in the upper end of the penstock 13 will close, if installed, as well as the drum/ball/solenoid valve 7 will close, if installed. If the closing and opening of the flow is done solely by the spear valve 12, then this will close. Since there are several options mentioned for closing the working fluid flow, the main purpose is actually to avoid reversing of the working fluid volume when the floating device descends, and this can be done in several ways, as explained above. When the floating device descends, the piston 5 will start to move upwards relative the cylinder 1. One-way valves 17, in, above or below the piston 5, which also may be spring loaded, will open and let the working fluid pass through the piston 5 from above to below. The working fluid level will remain fairly constant, as the piston 5 in this way only moves through the working fluid. Since other valves are closed, there will be suction below the piston 5, also adding to keeping the working fluid in almost the same position. Also note the description with reference to FIG. 2, outlining an alternative way of piping the working fluid flow, but with the same effect.

The one-way valve 11 in the penstock, may be omitted, as the closing of the spear valve 12 or drum/ball/solenoid valve 7, will have the similar effect. Likewise, it is possible to run the system without the drum/ball/solenoid valve 7 or closing of the spear valve 12, by only having a one-way valve 11 to control the flow. If this solution is used, the either fixed or adjustable opening of the spear valve 12, will resolve in the increase in pressure in the system, although latching, as described below, is not possible.

At the end of the descent of the floating device, i.e. in the trough of the wave, the piston 5 will be at its upper-most position at the end of its upward stroke. The cylinder 1 will always be filled with working fluid, so that the piston 5 moves upwards in relation to the working fluid while the floating device is descending. In case of the alternate solution with an outside return line 19, as described with reference to FIG. 2 below, the cylinder 1 will also always be filled with working fluid above and below the piston 5, but the working fluid will be moved around, from the top of the piston 5, to below the piston 5, during the descending phase due to suction created by the relative upwards stroke of the piston 5.

Subsequently, when the floating device moves upwards with the wave, the cylinder 1 moves with it, while the piston 5 stands still. The working fluid mass around the piston 5 also stands mainly still. The working fluid that moves is the working fluid being compressed and squeezed out of at least one opening in the lower portion of the cylinder 1, into the at least one penstock 13, being pressed upwards towards through the penstock 13 and directed towards the water turbine 4 when the spear valve 12 and/or drum valve 7 is opened and allowing the working fluid to flow. In other words, the overwhelming majority of the working fluid is standing still in relation to the surrounding working fluid, meaning that there will only be minor energy drawn for this work. There can be one or more one-way valves 17, in the piston 5 itself and/or in the return line 19. It is conceivable to arrange at least one penstock 13 inside the cylinder 1, too, although in that case the piston 5 must be redesigned.

After the working fluid has hit the water turbine 4, it will free-fall into the cylinder 1 through the third opening between the housing 16 and the upper end of the cylinder 1, keeping the working fluid level relatively constant, also helped by the suction created by the piston 5, going downwards relative the cylinder 1. An equal amount of working fluid that is pushed out from the lower end of the cylinder 1, will by this principle run in a closed loop back into the upper end of the cylinder 1.

The lifetime in regular hydro power stations are more than thirty years. Should seawater be used as the working fluid, a slightly different grade of stainless steel could be used, to avoid pitting of the buckets and other parts of the water turbine 4. Adding 2% molybdenum is a common method. Otherwise, an off-the-shelf turbine concept may be used.

However, as the present disclosure proposes a closed system, freshwater, possibly with some additives, is a more suitable working fluid than seawater, but both possible. As a result, the working fluid used may be less corrosive on the components of the PTO, thus increasing the lifetime and/or reducing the frequency of maintenance and service to keep the PTO operating at optimal conditions. Another reason for mounting the water turbine 4 directly above of the cylinder 1, in addition to providing the compact closed-loop system, is to avoid having any flexible tubes with a more limited lifetime and to directly use the power of the working fluid pressure in order to decrease power losses. Thus, the penstocks 13 are preferably made of a rigid material to withstand the high pressure of the working fluid.

The material of the cylinder 1, piston 5, piston one-way valve 17 and piston rod 6, can be of several options, such as metal or polymer composite material comprising reinforcing fibres, for example. Steel or aluminium in combination with composites are one alternative, since it thereby will be strong and thin in relation to weight. If so, fabrication and installation are also easier due to the lower weight. However, massive material like steel, drilled out to correct bore on the inside, as well as turned down on the outside matching the local stresses, is also a valid option.

Figure 2:
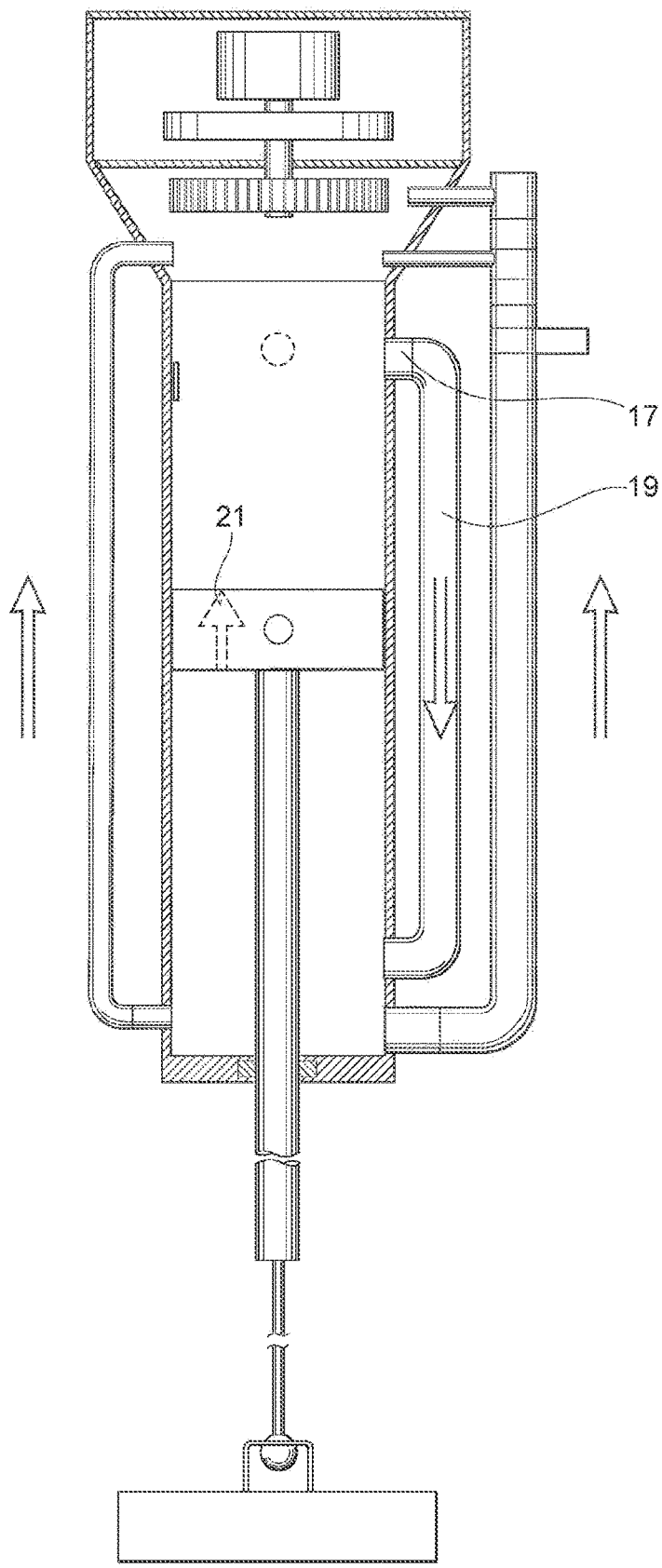
FIG. 2 shows a schematic cross-sectional view of a power take-off apparatus according to a second embodiment of the present disclosure.

Referring now to FIG. 2, another embodiment is shown, wherein the at least one forward conduit with the one-way valve 17 in the piston 5, is replaced by a return line 19, going from the upper end to the lower end of the cylinder 1, and containing a one-way valve 17, preventing the working fluid from flowing upwards. In FIG. 2, an optional pressure relief valve 21, is positioned in the piston 5, but one or more pressure relief valves 8, may be positioned in a pressure relief tube 9 as shown in FIG. 1, to complement each other. The principle of the pressure relief valve 21, may be combined with the one-way valve 17 arranged in the piston 5, either in the same valve, or sitting next to each other. By designing the float so that the net volume of air under water and the maximum lifting force equals the maximum load of the PTO and float, it will act as a safety valve by itself. In other words, the float will be submerged under water if any of the above-mentioned relief valves should not open, thereby avoiding structural damage to the float or the PTO. As storm survival is crucial, a well-known solution is to force a WEC under water when storms arise. This can be achieved by overriding the pressure relief valves 21/24 to a constant closed position, and thereafter close the valve 7 or 12 as in normal operation in the wave trough, but not allowing them to open at a certain pressure as otherwise normal. This will keep the float mainly submerged in the higher parts of the wave movement, thereby avoiding the higher lateral surge forces of the waves. To accommodate for this option, the distance between the upper side of the float, to the lower side of the housing 16, should be extended.

Figure 3:
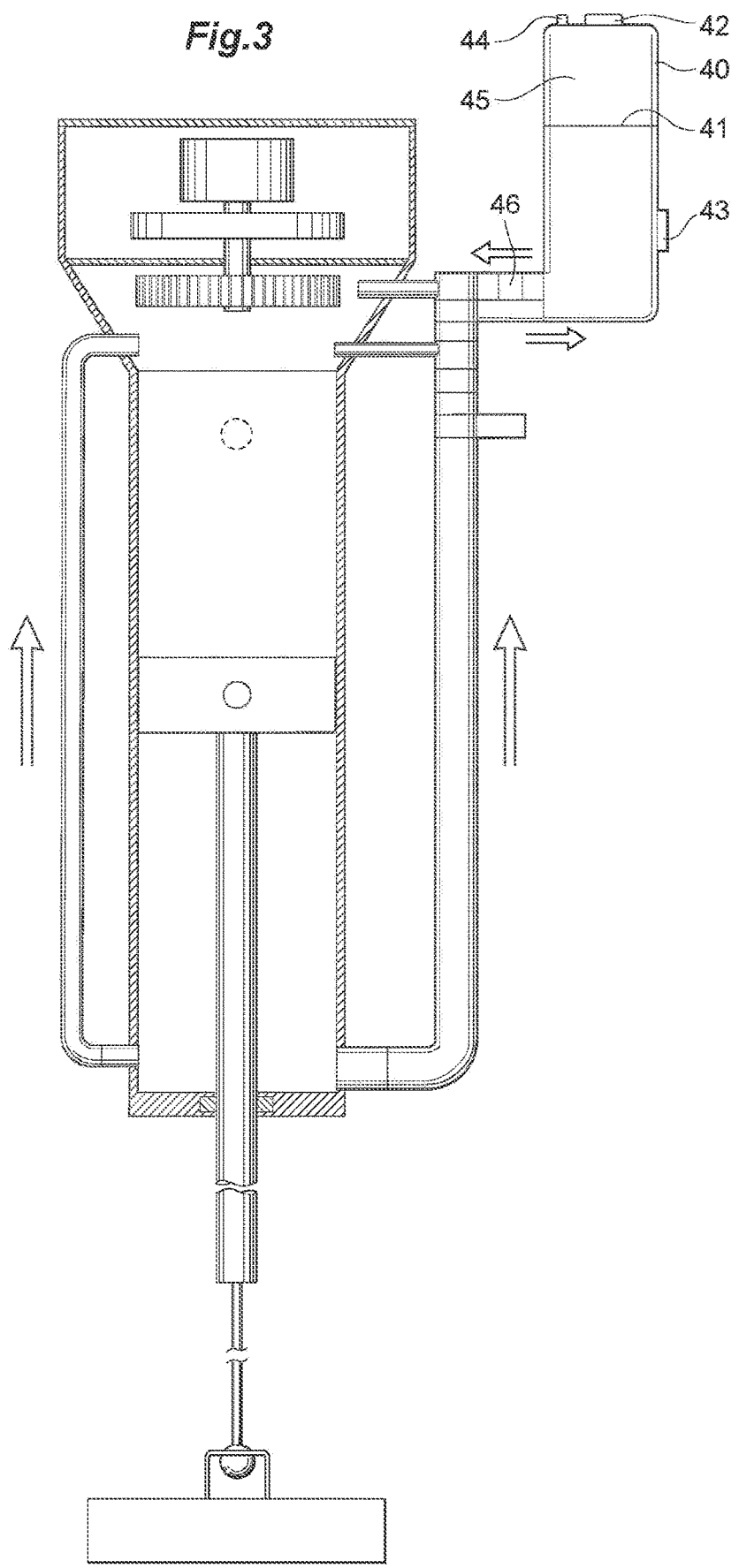
FIG. 3 shows a schematic cross-sectional view of a power take-off apparatus including a pressure tank according to one embodiment of the present disclosure.

Referring now to FIG. 3, there is shown a pressure tank 40 arranged in fluid communication with the closed loop of the power take-off apparatus between the penstock 13 and the water turbine 4. More specifically, in this embodiment the working fluid passes from the penstock 13 into the pressure tank 40 before passing through the spear valve 12 and impinging on the water turbine 4. The purpose of the pressure tank 40 is to provide a substantially continuous and constant pressure of the working fluid delivered to the water turbine 4 in order maintain its rotation. To this end, the pressure tank 40 comprises a gas/air chamber 45, with a piston or membrane 41, which divides the air from the working fluid. Alternatively, the piston or membrane 41 is dispensable and the line 41 in FIG. 4 may simply represent the working fluid level. A gas/air pressure sensor 42 continuously monitors the pressure and gives a signal if the pressure is too high or low, so that refill or evacuation can be done through a gas/air refill cap 44 if necessary. A water level/piston sensor 43, gives a signal when the working fluid level reaches this height, whereupon this triggers closing of a (e.g. solenoid) valve 46, so that the gas cannot escape, and instead wait for another pressure build-up in a new cycle.

Figure 4:
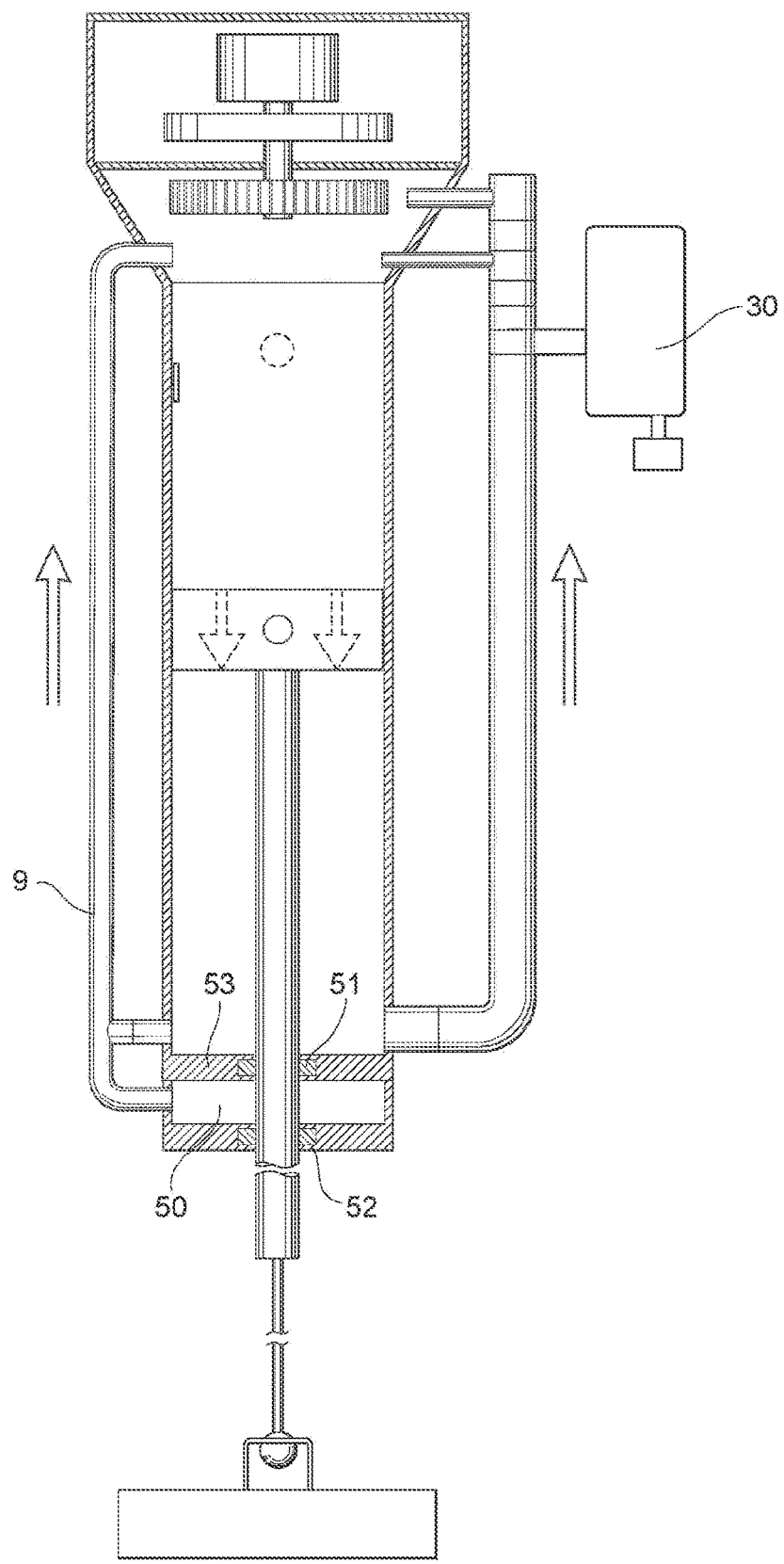
FIG. 4 shows a schematic cross-sectional view of a power take-off apparatus including a conditioner unit according to one embodiment of the present disclosure.

Referring now to FIG. 4, to minimise losses of working fluid to the surrounding seawater, it is conceivable to have a low-pressure section below the cylinder 1, collecting any working fluid leaking through the high-pressure seal 51 above. To this end, the lower end of the cylinder 1 is divided into two spaces by means of a cylinder partition 53 with a through-going opening for the piston rod 6 in which the high-pressure seal 51 is seated to provide a seal against the piston rod 6. Below the cylinder partition 53, a lower space 50 is thus created which is in fluid communication with the upper end of the cylinder 1 or the housing 16 via the at least one pressure relief tube 9, formed by piping extending externally along the cylinder 1. The bottom wall of the cylinder 1 has a through-going opening for the piston rod 6 in which a low-pressure seal 52 is seated. Through the at least one pressure relief tube 9, any working fluid leaking through the high-pressure seal 51 into lower space 50 will be transported to the upper end of the cylinder 1. In this way, any potential minor leakage of working fluid outwards to the environment, will be further reduced.

Additionally, in FIG. 4, there is shown a conditioner unit 30, located on the right side in the drawing, connected to the penstock 13. However, the conditioner unit 30 may be placed at any location in fluid communication with the closed loop of the PTO to enable interaction with the working fluid as will be explained in the following.

Referring now to FIG. 5, the conditioner unit 30 is shown more in detail. the conditioner unit 30 comprises a fluid analysis chamber 31, a mixing chamber 32, a filter 33, a waste chamber 34, and an additive chamber 35. In the fluid analysis chamber 31, there is provided one or more sensors (not shown) to analyse the state of the working fluid, e.g. with respect to transparency/turbidity, chemical composition, presence and size of solids etc. The mixing chamber 32 is in fluid communication with the additive chamber 35 which contains additives such as lubricants, anti-corrosive agents or other mediums for enhancing operation of the PTO. The additives may be added to the working fluid as necessary and mixed with the working fluid in the mixing chamber 32 before entering the closed loop of the PTO.

Further, the conditioner unit 30 comprises a waste chamber 34 for separating solid particles from the working fluid emanating e.g. from wear of components of the PTO. The working fluid may be pumped into the waste chamber 34 through a separate conduit (not shown) with a check valve and be returned to the closed loop through the filter 33 to ensure that the debris remains in the waste chamber 34.

As there probably will be some losses over time, the conditioner unit 30 is configured to replenish the working fluid. A working fluid level sensor 22 in the upper part of the cylinder 1, will be triggered when the height of the working fluid goes below a certain level, and the conditioner unit 30 will then replenish the working fluid with water and/or fluid as required. Rainwater could be a source of refill. Alternatively, a small electrical pump may supply fluid at the upper area of the cylinder 1.

In the vicinity of the inlet and outlet ports to the conditioner unit 30, fairings or partitions may be provided which extend into the penstock 13 to deflect some of the working fluid from the penstock 13 and thus create an automatic flow through the conditioner unit 30.

The conditioner unit 30 may in some embodiment further comprise means for communication with an external control station, e.g. located onshore and monitoring one or more WEC units. Preferably, communication is carried out over a wireless connection established between the WEC unit and the control station as known in the art, or by internet fibre cable contained in the subsea electrical cable going to shore. The conditioner unit 30 may also comprise means for generating an alarm and/or sending a signal to the control station indicating that service is required, for instance if the working fluid has become polluted, the additives have run out, the waste chamber 34 is full, the level of working fluid has become too low, any of the valves are blocked or malfunctioning or other possible scenarios relating to the functioning of the power take-off apparatus, the closed loop or any of the components. Suitable sensors (e.g. pressure, working fluid level, etc.) may be used to determine when appropriate predetermined thresholds have been exceeded to trigger the alarm.

The piston rod 6 is connected at the lower end directly to a U-joint 23, to counter for the horizontal movement of the floating device. The principle of the U-joint 23 being the same as in any socket wrench set or auto-mobile prop shaft. Other flexible solutions may be used as well. If the PTO is mounted in a frame or similar, with only vertical movement, a stiff connection is in order. The U-joint or ball joint 23, is in turn connected to a suction anchor/suction bucket/piles/ mooring weight 10 on the seafloor, alternatively screws or rod(s) may be drilled and fastened into the seafloor rock. However, other solutions for fixing the piston rod 6 in relation to the seafloor to counter the relative movement between the piston 5 and the cylinder 1 due to waves are also conceivable and fall within the scope of the present disclosure.

Rotational movement of the floating device 66 due to changes in wave direction also creates a similar rotational movement of the cylinder 1 if the float is not round shaped. The piston rings and piston 5 (connected to the substantially stationary piston rod 6 attached to the seafloor) can still rotate inside the cylinder 1 as the friction is alleviated by the combined vertical motion. In order to reduce loads and wear on the PTO, a solution for facilitating rotation between the piston 5 and the cylinder 1 is envisaged. For instance, the piston 5 could be provided with bearings to facilitate rotation in relation to the cylinder 1. Another alternative is to introduce a rotational joint above or below the U-joint 23.

Referring now to FIG. 6, there is shown another embodiment wherein the piston rod 6 comprises a first section 61 attached to the piston 5 and extending into the cylinder 1 from above, a second section 62 arranged externally to the cylinder 1 parallel to the first, and a third section 63 joining the first and second sections 61, 62 above the cylinder 1. To accommodate the first section 61 of the piston rod 6, the housing 16 has been designed in an offset configuration with slanted walls such that the axis of rotation of the water turbine 4 is located eccentric with respect to the longitudinal axis of the cylinder 1. The dashed line in FIG. 6 represents a floating device 66 to which the power take-off apparatus of the present disclosure is attached to form a WEC unit. The floating device 66 can be of different shapes, one example of a suitable floating device is disclosed in WO 2017/160216, which is incorporated herein in its entirety.

Referring now to FIG. 7, the housing 16 of the PTO is shown as seen from above. In this view, only the third section 63 of the piston rod 6 is visible positioned above the cylinder 1 and the housing 16. The offset location of the components for conversion of wave power to electrical energy, i.e. the water turbine 4, flywheel 14 and generator 15, are visualised on the right side of FIG. 7. In practical applications of the PTO, the components will be covered by a suitable cover to prevent entry of water. In this inverse configuration of the piston rod 6, the housing 16 comprises a feedthrough opening for the first section 61 to enter into the cylinder 1 from above.

The second section 62 of the piston rod 6 may be adapted to be attached to the seafloor by means of a suitable interface 65 at the lower end, e.g. via a suction anchor/suction bucket/piles/mooring weight 10, or indirectly via a joint 23 and/or mooring as mentioned above. The lower end interface 65 may be hammered directly into the seafloor, or be a suction anchor, piles or a weight, then connected the second section 62. The cylinder 1 comprises a pair of sliding couplings 64 arranged longitudinally spaced apart on the external surface thereof and connected to the second section 62 to allow sliding of the cylinder 1 along the second section 62 of the piston rod 6. With an alternative configuration of the piston rod 6 attached to the piston 5 from above, the cylinder 1 no longer requires a seal at the lower end, thus ensuring that the working fluid cannot escape from the closed-loop system into the surrounding water, and conversely no seawater can enter into the closed-loop system.

In an alternative embodiment, instead of having the WEC unit attached to the seafloor, the piston rod 6 may be attached to a separate offshore structure, for instance onto an oil rig leg(s) submerged under the water surface. This solution enables retrofitting the PTO to make use of pre-existing offshore installations and has the advantage that the water depth at the installation site becomes irrelevant since the oil rigs and similar suitable offshore structures with their significant weight and draft remain substantially stationary in relation to the seafloor. In the inverse configuration of the piston rod 6 as discussed in connection with FIG. 6 above, the second section 62 of the piston rod 6 would then be arranged parallel and rigidly attached to the leg of the oil rig.

The spear valve 12, which controls the pressure and flow of working fluid hitting the buckets of the water turbine 4, if also closing or adjusting in every wave cycle, might have to be slightly strengthened, as the number of movements will be higher than in conventional use. A separate valve just before the spear valve 12 might be an option to relieve a standard spear valve of wear and tear. This may for instance be a drum or a ball valve 7, a solenoid valve or other solution capable of closing and opening the working fluid stream at certain pressures. This valve 7 may be operated for instance electrically, hydraulically or by air pressure. The water turbine 4 may operate with fixed nozzles instead of adjustable spear valves, especially if having multiple nozzles, and may therefore use the separate valve 7 to let pressurised working fluid into an inlet ducting provided around the water turbine 4.

For more fine tuning and optimization of the system, the opening area of the spear valves 12 may be adjusted to match the size of every incoming wave, and even being adjusted during the upwards movement in the wave. The latter to achieve a ratio as close as possible to the working fluid speed being two times the speed of the water turbine buckets. To gain the maximum output, the spear valve 12 or the drum valve 7 will keep the system locked as a hydraulic lock when the wave is at its lowest. When the wave rises, the floating device is kept still such that it is partially or even fully immersed, trapping a large amount of air under water, thus increasing the buoyant force and thereby also the pressure exerted on the working fluid. The higher the wave the larger the draft of the floating device is possible, but for instance a maximum of three meters would be practical in most areas. Pressure sensors 64 in the lower section of the cylinder 1 as well as in the upper section of the penstock 13, give information to the control system. When the desired pressure in relation to the relevant wave height is achieved, the drum valve 7 or spear valve(s) 12 opens, relieving high pressure working fluid to the water turbine 4, and at the same time allowing the floating device to rise upwards. This procedure is called latching and is achieved in a very simple manner in this concept, as opposed to other marine solutions. For simpler and smaller WEC units, they will also work with a fixed nozzle, no drum valve 7 and no pressure sensors 64, but with a lower efficiency.

The water turbine 4 is connected to a generator 15, either a preferably vertical axis placed in a housing 16 on top of the cylinder 1, or a horizontal axis with a driveshaft connected to a generator on the floating device. In the latter, the connection may preferably be a prop shaft. An optional flywheel 14 may be arranged in connection with the water turbine 4 and the generator 15. The optimum pressure of the working fluid coming from the penstock 13 will depend upon the size and lifting force of the floating platform, the wave height and wave speed, the cylinder 1 diameter, the internal flow resistance as well as the resistance in the flywheel 14 and the generator 15. As the working fluid will impinge on the turbine 4 with high force during each heave motion, the generator 15 will experience a rather rapid acceleration force, even if dampened by the flywheel 14. This may be dampened by a torsion or torque coupling between the water turbine 4 and the generator 15, similar to solutions in wind power applications. If the solution with the generator 15 on the floating device is chosen, it might be moving in a different pattern than the cylinder 1, a flexible connection to the generator 15 is needed. This is done by the prop shaft, having U-joints in both ends or near the ends. Preferably a spline is provided in the middle area. In this way, the U-joints will take care of the frequent and larger movements of the waves hitting the long side of a rectangular platform, while the spline will handle the smaller movements when waves move the platform from the short side. A torsion or torque coupling in connection with the prop shaft, similar to concepts used in wind power applications, may be installed.

It is also fully plausible to have a horizontal axis turbine, flywheel and generator, all positioned in the housing 16 above the cylinder 1, as an asymmetric unit. The advantage of this configuration is that a drive shaft is not needed, possibly less noise in the housing 16 from splashing working fluid, as well as possible less losses due water disturbances. The housing 16, should be divided into a wet section for the water turbine 4, and a dry section for the generator 15, and control system. This may be achieved by means of a vertical housing partition (not shown).

The option with the vertical axis turbine (the runner wheel positioned horizontally), and the water turbine 4 positioned directly above the top of the cylinder 1, with water falling directly into the cylinder 1, is a more compact solution, cf. FIG. 1. The hydro turbine 4 may have from one to several nozzles, as well as from one to several runners. In this embodiment, the generator 15 may be positioned directly on top of the hydro turbine 4. In this set up, a flywheel 14 directly below the lower runner wheel, as well as on top of the generator 15, or in between, may be a practical solution. The housing 16 is divided into a wet section for the water turbine 4, and a dry section for the generator 15, and control system. This may be achieved by means of the horizontal housing partition 18, as shown in FIG. 1. It is also conceivable to have two or more turbine wheels 4, also of different diameter and with different bucket sizing, to accommodate for varying wave heights and thereby increase efficiency even further.

The outside of the cylinder 1 and platform may be coated by antifouling paint. The dark inside of the cylinder 1 will not attract much organic life to grow. Competent consultant in this field states that this will be of little or moderate problem, as the organic life is generally attracted to lighter areas. As the working fluid will be in constant movement, it significantly reduces the odds of any major challenges in this area. Most likely an additive will be added to the working fluid, both to avoid this problem, but also possible to lessen friction and thereby wear on the components. The additive should be environmentally friendly in case of any possible leakage. Possible treatment with ceramic coatings could further contribute positively in favour of less organisms being attracted to the cylinder 1 walls.

The piston 5 may/should nevertheless have upper and lower scrape rings to remove residuals that could grow on the cylinder wall. As the stroke length in normal operation will be much lower than maximum length, residuals in the upper and lower area may need to be cleaned away at intervals. This might be done by releasing the joint 23 and move the piston for the whole distance up and down. Releasing one or more anchoring lines will also pull the piston 5 to the downward position, so that the lower section of the cylinder 1. Another option is to mount an extra scrape piston of small height but the same diameter, in the upper area, possibly also in the lower area, and from time to time move them towards centre.

For cleaning of the piston rod 6, a feasible solution is to mount a movable brush around the piston rod, driven upwards by buoyancy, and downwards with its own weight or lines via a wheel on the weight 10, then upwards to the floating device. It could also be moved both circular as well as up and down with pressurized air, pressurized water or by an electric motor. A fifth option would be movable high-pressure water nozzles or robots, steered from the outside by divers or from remote controls on board.

Electricity to run the systems can be tapped from the generator 15 and via a converter be led to a battery, supplying the systems. Alternatively, a small simple wind power or sun power unit may as well supply the battery with sufficient power, as the periods with zero winds at sea are quite short. Reverse current from the grid also possible.

In any technical system, there are risks of parts failing or shearing. Besides the pressure relief valves 8, 21, 24 mentioned above, more safety components may or should be installed. These may include explosive cartridges or weaker points to break off the piston rod 6 or the bearing connection in case of piston seizing, and/or clogging or malfunctioning of a valve. Similar solutions could be applied to some of the mooring chains so as to move the platform laterally from the location, thereby avoiding parts colliding more than necessary in the event of a shear or parts being stuck. Likewise control features that dumps the pressure via pressure relief valves 8, 21, 24, either to avoid the maximum bar pressure to be exceeded, or to totally dump the pressure in case of some defined malfunctions. Warning sensors connected to fire suppressant systems as well as bilge pumps will be of relevance as well. Without listing all options, similar conservative set-ups as in shipping and aviation is what will be needed, especially in the larger and costlier versions of this platform and power take-off concept.

Preferred embodiments of a power take-off apparatus for a wave energy converter of point absorber type have been disclosed above. However, the person skilled in the art realizes that this can be varied within the scope of the appended claims without departing from the inventive idea.

All the described alternative embodiments above or parts of an embodiment can be freely combined or employed separately from each other without departing from the inventive idea as long as the combination is not contradictory.

Certain embodiments or components or features of components have been noted herein as being "preferred" and some options as being "preferable" or the like and such indications are to be understood as relating to a preference of the applicant at the time this application was filed. Such embodiments, components or features noted as being "preferred" or "preferable" or the like are optional and are not required for implementation of the inventions disclosed herein unless otherwise indicated as being required, or specifically included within the claims that follow.

The invention claimed is:

1. A power take-off apparatus for a wave energy converter of point absorber type, comprising:
    a cylinder adapted to be attached to a floating device and comprising a first upper end and a second lower end;
    a piston arranged reciprocating inside the cylinder and having a piston rod-adapted to be attached to a mooring;
    at least one penstock arranged parallel to the cylinder and comprising a first lower end in fluid communication with the second end of the cylinder through a first opening therebetween, and a second upper end comprising a second opening;
    a housing arranged above the first end of the cylinder, wherein the housing is in fluid communication with the penstock through the second opening; and
    a water turbine arranged inside the housing and oriented such that working fluid entering the housing from the at least one penstock through the second opening causes rotation of the water turbine to drive an electrical generator connected thereto;

wherein working fluid present in the second end of the cylinder below the piston will enter into the at least one penstock through the first opening and exit the at least one penstock through the second opening in response to a downward stroke of the piston in relation to the cylinder;

wherein the housing is in fluid communication with the first end of the cylinder through a third opening in a bottom of the housing such that the cylinder, the at least one penstock and the housing together form a closed loop for a working fluid in the power take-off apparatus; and wherein the power take-off apparatus further comprises at least one forward conduit having at least one one-way valve arranged to allow passage of the working fluid only in a direction from the first end of the cylinder above the piston through the at least one forward conduit to the second end of the cylinder below the piston in response to an upward stroke of the piston in relation to the cylinder.

2. The power take-off apparatus according to claim 1, wherein the at least one forward conduit and the at least one one-way valve is arranged in the piston.

3. The power take-off apparatus according to claim 1, wherein the at least one forward conduit comprises a return line arranged external to the cylinder.

4. The power take-off apparatus according to claim 1, further comprising a conditioner unit arranged in fluid communication with the closed loop formed by the cylinder, penstock and housing, wherein the conditioner unit is arranged to replenish the closed loop with working fluid, monitor the working fluid, clean the working fluid, and/or add additives to the working fluid which reduce friction and/or corrosion in the power take-off apparatus.

5. The power take-off apparatus according to claim 4, wherein the conditioner unit comprises a fluid analysis chamber, a mixing chamber, a filter, a waste chamber and/or an additive chamber.

6. The power take-off apparatus according to claim 1, further comprising a flywheel arranged to rotate coaxially with an axis of rotation of the water turbine, wherein the water turbine and the flywheel are separated by a partition wall inside the housing.

7. The power take-off apparatus according to claim 1, further comprising a pressure tank arranged in fluid communication with the closed loop between the water turbine and the at least one penstock, wherein the pressure tank is arranged to provide a substantially continuous and constant pressure of the working fluid delivered to the water turbine.

8. The power take-off apparatus according to claim 1, wherein the generator is arranged to rotate the water turbine in order to control the rotational speed of the water turbine when the working fluid does not cause rotation of the water turbine.

9. The power take-off apparatus according to claim 1, further comprising at least one valve arranged in the at least one penstock and configured to allow passage of working fluid only in a direction from the first lower end to the second upper end of the at least one penstock.

10. The power take-off apparatus according to claim 1, further comprising at least one first bypass conduit arranged in fluid communication with the at least one penstock and the housing below the water turbine or the first end of the cylinder, wherein the at least one first bypass conduit comprises a first relief valve configured to open at a predetermined pressure to allow passage of the working fluid from the at least one penstock through the at least one first bypass conduit below the water turbine or the first end of the cylinder.

11. The power take-off apparatus according to claim 1, further comprising at least one second bypass conduit and having a first lower end in fluid communication with the second end of the cylinder and a second upper end in fluid communication with the housing below the water turbine or the first end of the cylinder, wherein the at least one second bypass conduit comprises a second relief valve configured to open at a predetermined pressure to allow passage of the working fluid from the second end of the cylinder below the piston through the at least one second bypass conduit to the housing below the water turbine or the first end of the cylinder above the piston.

12. The power take-off apparatus according to claim 11, wherein the at least one second bypass conduit with the second relief valve is arranged in the piston.

13. The power take-off apparatus according to claim 1, further comprising a cylinder partition dividing the second end of the cylinder into two spaces, wherein the partition comprises an opening with a high-pressure seal surrounding the piston rod and a bottom wall of the cylinder comprises an opening with a low-pressure seal surrounding the piston rod, wherein a lower space is in fluid communication with the first end of the cylinder through at least one third bypass conduit to allow passage of the working fluid in a direction from the lower space to the first end of the cylinder.

14. The power take-off apparatus according to claim 1, wherein the piston rod comprises a first section attached to the piston from above, a second section arranged externally to the cylinder parallel to the first section, and a third section joining the first and second sections above the cylinder, wherein the cylinder comprises a pair of sliding couplings arranged to allow sliding of the cylinder along the second section of the piston rod.

15. The power take-off apparatus according to claim 1, wherein the piston rod is arranged to be attached to a separate offshore structure.

16. A wave energy converter of point absorber type, comprising a floating device, and a power take-off apparatus according to claim 1.

17. Use of a power take-off apparatus according to claim 1 in a wave energy converter of point absorber type to generate electrical energy from wave power in a body of water.

18. The use according to claim 17, wherein the generator is used to rotate the water turbine in order to control the rotational speed of the water turbine when the working fluid does not cause rotation of the water turbine.

* * * * *